United States Patent [19]

Haas et al.

[11] Patent Number: 4,769,167

[45] Date of Patent: * Sep. 6, 1988

[54] AQUEOUS FUNCTIONAL FLUIDS BASED ON POLYMERS

[75] Inventors: Raimund Haas, Frankfurt am Main; Dieter Engel, Kelsterbach; Rainer Helwerth, Eschborn, all of Fed. Rep. of Germany

[73] Assignee: Hoechst Aktiengesellschaft, Frankfurt am Main, Fed. Rep. of Germany

[*] Notice: The portion of the term of this patent subsequent to Feb. 11, 2003 has been disclaimed.

[21] Appl. No.: 938,579

[22] Filed: Dec. 5, 1986

Related U.S. Application Data

[63] Continuation of Ser. No. 858,569, Apr. 24, 1986, Pat. No. 4,668,410, which is a continuation of Ser. No. 699,007, Feb. 9, 1985, abandoned.

[30] Foreign Application Priority Data

Feb. 9, 1984 [DE] Fed. Rep. of Germany ....... 3404537

[51] Int. Cl.$^4$ ................. C10M 145/12; C10M 173/02
[52] U.S. Cl. ..................................... 252/76; 252/49.3; 252/75; 252/77; 252/79; 524/558; 526/318; 526/318.2; 526/318.41; 526/320; 526/932
[58] Field of Search ............ 252/49.3, 75, 76, 77, 252/79; 524/558; 526/318, 318.2, 318.41, 320, 932

[56] References Cited

U.S. PATENT DOCUMENTS

| | | | |
|---|---|---|---|
| 3,708,445 | 1/1973 | Junas et al. | 526/318.2 |
| 4,138,381 | 2/1979 | Chang et al. | 526/932 |
| 4,462,920 | 7/1984 | Snyder, Jr. et al. | 252/75 |
| 4,469,611 | 9/1984 | Snyder, Jr. et al. | 252/75 |
| 4,569,965 | 2/1986 | Engel et al. | 526/318.2 |

*Primary Examiner*—Robert Wax

[57] ABSTRACT

Aqueous functional fluids, in particular hydraulic and metal-working fluids, containing a copolymer which is prepared by emulsion or solution copolymerization, initiated by free radicals, of unsaturated, copolymerizable monomers, the copolymers being built up from:

(a) 1-60% by weight of ethylenically unsaturated carboxylic acids,
(b) 0.5-30% by weight of a surface-active unsaturated ester,
(c) 30-85% by weight of methacrylic acid esters or acrylic acid esters of aliphatic ($C_1$-$C_{18}$)-alcohols,
(d) 0-40% by weight of other ethylenically unsaturated comonomers,
(e) 0-3% by weight of polyethylenically unsaturated compounds, and
(f) 0-5% by weight of molecular weight regulators, and, if appropriate, the free acid groups of the copolymers subsequently having been partly or completely neutralized by addition of bases, and converted into water-soluble or colloidally water-dispersible copolymer salts.

6 Claims, No Drawings

AQUEOUS FUNCTIONAL FLUIDS BASED ON POLYMERS

CROSS-REFERENCE TO RELATED APPLICATIONS

This application is a continuation of application Ser. No. 858,569 filed Apr. 24, 1986, now U.S. Pat. No. 4,668,410, which is a continuation of Ser. No. 699,007 filed Feb. 9, 1985, now abandoned.

Aqueous functional fluids containing water-soluble polymers are employed in many industrial processes, the chemical composition of the polymer frequently being different, depending on the field of use. The term functional fluid is to be understood, here and in the following text, as meaning liquid systems which, very generally, can exercise a function. Primarily, this term is understood to mean so-called working fluids such as, for instance, hydraulic fluids and, very generally, metal-working fluids, including lubricating fluids and anti-corrosion fluids.

It is known that water-soluble polymers are suitable for the formulation of both completely synthetic working fluids free from mineral oil and semi-synthetic working fluids of low mineral oil content. Hydraulic fluids of this type which are free from mineral oil or of low mineral oil content, and are therefore of low combustibility, are required in many fields of industry (mining, the aluminium die casting industry, smelting plants etc.) for reasons of safety. In addition, working fluids based on water-soluble polymers constitute a substantially lower environmental hazard, compared with pure mineral oil formulations, in the event of leakage. Functional fluids of this type can also be employed with less risk than pure mineral oils in the foodstuffs industry and in the textile sector. A further advantage of aqueous hydraulic fluids of this type is their compatibility with cooling agents and lubricants which are employed, for example, in the machining of materials, and which thus do not cause contamination of the working auxiliaries in the event of leakage in the hydraulic circulation system.

The main task of the polymers in the aqueous hydraulic formulations has hitherto been to adjust the viscosity to a value such that the thickening action achieved meets the technical requirements. Various commercially available polymer products, such as cellulose derivatives, polyacrylamides, polyacrylates, polyglycols or modified polyethers, exhibit good to very good thickening effects in certain ranges of molecular weight and weight concentrations. In the case of many synthetically prepared polymers, however, the viscosity-increasing action is rapidly reduced by influences caused by fluid mechanics or heat. Furthermore, many polymer solutions exhibit, even at moderate thickener contents, strongly non-Newtonian flow phenomena, which manifest themselves in the rheometer, in most cases in a drastic reduction in viscosity as the shear rate increases or at higher temperatures in the system.

U.S. Pat. No. 4,312,775 describes modified polyethers which exhibit very good thickening effects in a concentration range of 5–10% by weight, and achieve a satisfactory shear stability and temperature stability, in the presence of certain additives such as ethoxylated phosphate esters or mixtures of esters with water-soluble amines (0.5–1%). However, the close dependence of the viscosity of such polymer solutions as a function of the shear rate D greater than $10^2 s^{-1}$ and the close dependence of the solution viscosity on the temperature of measurement proves disadvantageous in a test in the high-shear viscometer.

European Pat. No. 0,088,718 also describes thickeners based on polyether derivatives, which are used for thickening natural and synthetic oils, aqueous solutions of electrolytes and aqueous solutions containing surfactants. The investigations into dependence on shear rate ($D \leq 30 s^{-1}$) have shown that the rheological behavior of these thickeners in preparations containing surfactants is Newtonian, whereas if sodium chloride was used, corresponding preparations containing surfactants had a strongly non-Newtonian flow behavior. The concentration of thickener was within a concentration range of 5 to 10%.

If water-soluble polyglycols are used, which is also known, the concentration employed in order to adjust the viscosity to the figure required is considerably higher (25–50% by weight). A Newtonian flow behavior and, in part, a good lubrication and wear behavior is observed in these polymers, while, in respect of heat stability, undesirable turbidity and demulsification phenomena manifest themselves in the aqueous phase in the case of many types of polyglycol even at temperatures only just above 40° C. In addition, these types of polymer possess, by themselves, no anti-corrosion properties at all in an aqueous solution.

The object of the present invention is to find polymeric additives for aqueous functional fluids, wherein, depending on the polymer concentration chosen, the aqueous fluid prepared therefrom should fulfill several tasks, namely that:

1. an adequate thickening action of the aqueous fluid is achieved within a concentration range of 1–20% by weight of polymer active substance,
2. an adequate shear stability of the functional fluid towards high shear loads is achieved in the flowing state, and quasi-Newtonian flow properties are achieved within a range of shear rates which is as wide as possible,
3. an advantageous viscosity/temperature behavior is achieved, i.e. a viscosity which decreases as little as possible as the temperature rises,
4. the functional fluid formed by the addition of the polymer has an improved lubrication and anti-corrosion behavior compared with the unthickened fluid, and
5. the functional fluid is insensitive towards the constituents causing hardness in water.

It has now been found, surprisingly, that aqueous fluids have these properties if the copolymers described below are admixed.

The invention relates to aqueous functional fluids containing copolymers prepared by emulsion or solution copolymerization, initiated by free radicals, of unsaturated, copolymerizable monomers and, where relevant, subsequent partial or complete neutralization of the free acid groups of the copolymers by addition of bases, which copolymers are built up from (a) 1–60% by weight, preferably 5–45% by weight, of ethylenically unsaturated ($C_3$–$C_5$)-monocarboxylic acids, ethylenically unsaturated ($C_4$–$C_6$)-dicarboxylic acids, or monoesters thereof with aliphatic ($C_1$–$C_8$)-alcohols, or mixtures of these monomers, preferably methacrylic acid, acrylic acid, crotonic acid, maleic acid, monoalkyl maleates or mixtures thereof, (b) 0.5 to 30% by weight of a surface-active unsaturated ester of the general formula I

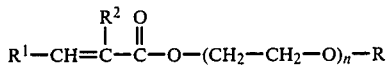

$$R^1-CH=\underset{\underset{CH_3}{|}}{C}-\underset{\underset{}{||}}{C}-O-(CH_2-CH_2-O)_n-R \quad (I)$$

in which n denotes a number from 2 to 100, $R^1$ and $R^2$ denote hydrogen or methyl, $R^1$ preferably denoting methyl and $R^2$ preferably denoting hydrogen, and R denotes an aliphatic ($C_2$-$C_{30}$)-radical, which can be linear or branched, a mono-, di- or tri-alkylphenyl radical with alkyl groups of in each case 4 to 12 carbon atoms or a block-copolymeric radical of the formula IIa or IIb

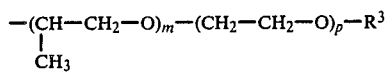

$$-(\underset{\underset{CH_3}{|}}{CH}-CH_2-O)_m-(CH_2-CH_2-O)_p-R^3 \quad (IIa)$$

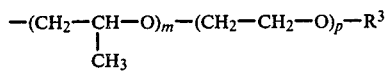

$$-(CH_2-\underset{\underset{CH_3}{|}}{CH}-O)_m-(CH_2-CH_2-O)_p-R^3 \quad (IIb)$$

in which m represents a number from 10 to 100, p represents a number from 0 to 100 and $R^3$ represents H, crotyl, ($C_1$-$C_{20}$)-alkyl, phenyl or alkylphenyl with ($C_1$-$C_{20}$)-alkyl groups, or R denotes a perfluorinated or partially fluorinated ($C_1$-$C_{16}$)-alkyl radical, (c) 30–85% by weight of methacrylic acid esters or acrylic acid esters of aliphatic ($C_1$-$C_{18}$)-alcohols or a mixture of these esters, (d) 0–40% by weight of other ethylenically unsaturated comonomers, preferably vinyl esters, vinylaromatics, ethylenically unsaturated nitriles, esters of ethylenically unsaturated monocarboxylic and dicarboxylic acids, where these have not already been listed above under (c), ethylenically unsaturated sulfonic acids or ethylenically unsaturated sulfonic acid derivatives, (e) 0–3% by weight of polyethylenically unsaturated compounds, preferably divinylbenzene, diallyl phthalate and butanediol diacrylate or dimethacrylate and (f) 0–5% by weight of molecular weight regulators, preferably dodecylmercaptan, tetrakis-mercaptoacetyl-pentaerythritol, carbon tetrachloride or bromotrichloro-methane.

On partial or complete neutralization, the copolymers become increasingly to completely water-soluble or colloidally dispersible in water. In the partially or completely neutralized form, they can be used as thickeners of aqueous systems with rheology-modifying properties in the abovementioned sense.

A preferred application method for the copolymers mentioned consists, for example, in admixing them in their non-neutralized and, in general, water-insoluble acid form as solutions in suitable solvents or, in particular, as low-viscosity aqueous dispersions to the aqueous or water-containing system to be thickened and then partially or completely neutralizing the resulting mixture with bases, such that the copolymers are converted into a water-soluble salt form, displaying their thickening and rheology-modifying action.

Examples of preferred compounds of component (a) of the copolymers are crotonic acid, maleic acid, itaconic acid and maleic acid monoesters and itaconic acid monoesters of straight-chain or branched ($C_1$-$C_8$)-alcohols. Acrylic acid and methacrylic acid are particularly preferred.

In the case of the monomers of component (b), preferred compounds of the formula I are those where n=10–80, in particular n=20–50, and also those where R=n- or iso-($C_2$-$C_{30}$)-alkyl, preferably ($C_{12}$-$C_{20}$)-alkyl and in particular ($C_{16}$-$C_{18}$)-alkyl, such as, for example, n- or iso-octyl, n- or iso-decyl, n- or iso-dodecyl, n- or iso-hexadecyl, n- or iso-octadecyl or mixtures of these radicals, so that, for example, crotonic acid esters with 10 ethylene oxide units and a $C_{12}$-alkyl radical or with 20 ethylene oxide units and an iso-octyl radical, or with 50 ethylene oxide units and a $C_{18}$-alkyl radical can result, or monoalkylphenyl with ($C_4$-$C_{12}$)-n- or iso-alkyl groups, preferably $C_8$- or $C_9$-n- or iso-alkyl groups, as, for example, iso-octylphenyl or iso-nonylphenyl, with which, for example, crotonic acid esters with 5 ethylene oxide units and an iso-octylphenyl radical, or with 11 ethylene oxide units and an iso-nonylphenyl radical can result, or dialkylphenyl with ($C_4$-$C_{12}$)-n- or iso-alkyl groups, such as, for example, diisobutylphenyl, diisooctylphenyl or diisononylphenyl, with which, for example, crotonic acid esters with 20 ethylene oxide units and a diisobutylphenyl radical, or 50 ethylene oxide units and a diisooctylphenyl radical, or 80 ethylene oxide units and a diisononylphenyl radical can result, or trialkylphenyl with ($C_4$-$C_{12}$)-n- or iso-alkyl groups, such as, for example, triisobutylphenyl, triisooctylphenyl or triisononylphenyl, with which, for example, crotonic acid esters of 11 ethylene oxide units and a triisobutylphenyl radical, or 23 ethylene oxide units and a triisononylphenyl radical, or 50 ethylene oxide units and a triisooctylphenyl radical, can result, or a radical of the formula IIa or IIb

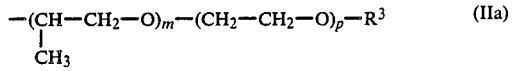

$$-(\underset{\underset{CH_3}{|}}{CH}-CH_2-O)_m-(CH_2-CH_2-O)_p-R^3 \quad (IIa)$$

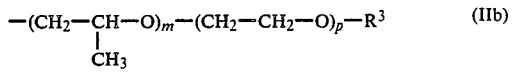

$$-(CH_2-\underset{\underset{CH_3}{|}}{CH}-O)_m-(CH_2-CH_2-O)_p-R^3 \quad (IIb)$$

preferably such a radical with m=20–80 and p=0–80, in particular 0–50, and preferably $R^3$=H, ($C_1$-$C_{20}$)-n- or iso-alkyl, n- or iso-alkylphenyl with ($C_1$-$C_{20}$)-alkyl groups, phenyl or crotyl, from which crotonic acid esters of ethylene oxide/propylene oxide copolymers with, for example, p=20, m=20 and an iso-butyl radical, or p=30, m=40 and a crotyl radical, or p=50 and m=80, or m=20, p=0 and a nonylphenyl radical, can result, or ($C_2$-$C_{16}$)-perfluoroalkyl- or partially fluorinated alkyl.

Mixtures of the monomers mentioned can also be employed, in which case it should be taken into consideration that the compounds to be employed as a rule are prepared from industrial intermediates which may have, for example, a certain distribution range in respect of their degree of oxyethylation or their molecular weight distribution.

Preferred compounds of component (c) are methyl, ethyl, isopropyl, isobutyl, tert.-butyl and n-butyl acrylate and methacrylate. The methyl and ethyl esters of acrylic and methacrylic acid are particularly preferred.

Particularly suitable compounds of component (d) are: vinyl esters of ($C_1$-$C_{12}$)-carboxylic acids, such as acetic acid, propionic acid, 2-ethylhexanoic acid, versatic acid 9, versatic acid 10, lauric acid and furthermore unsaturated aromatic compounds, such as styrene or vinyltoluene, and furthermore esters of unsaturated monocarboxylic and dicarboxylic acids with $C_8$-alcohols or higher alcohols, such as acrylic and methacrylic acid esters, for example dodecyl acrylate or octadecyl methacrylate, or crotonic acid esters of $(C_1-C_8)$-alcohols, such as, for example, methyl crotonate or 2-ethylhexyl crotonate, or maleic or itaconic acid esters with $(C_1-C_8)$-alcohols, such as, for example, dimethyl maleate, dibutyl maleate, di-2-ethylhexyl maleate or dimethyl itaconate, or acrylic acid monoesters or methacrylic acid monoesters of diols and triols, such as, for example, ethylene glycol, butene-1,4-diol, hexane-1,6-diol glycerol and trimethylolpropane, or unsaturated nitriles, such as acrylonitrile or methacrylonitrile, or unsaturated sulfonic acids, preferably ethylenesulfonic acid or acrylamidopropanesulfonic acid, or preferably, salts thereof, in particular alkali metal or ammonium salts.

Particularly suitable compounds of component (e) are: diallyl phthalate, divinylbenzene, butanediol methacrylate, ethanediol dimethacrylate, hexanediol dimethacrylate, ethanediol diacrylate, butanediol diacrylate, hexanediol diacrylate, pentaerythritol triacrylate, trimethylolpropane triacrylate, tetraethylene glycol diacrylate, tripropylene glycol diacrylate and trimethylolpropane trimethacrylate.

A copolymer built up from components (a) to (f) can be prepared, for example, by conventional solution copolymerization initiated by free radicals in conventional solvents or in the form of a dispersion by conventional emulsion copolymerization. If the preparation is via emulsion copolymerization, the solids content of the resulting dispersion is preferably between 10 and 55, in particular 25 to 50,% by weight. Emulsion copolymerization is the preferred preparation process, the surface-active comonomer (b) preferably being initially introduced into the aqueous phase.

The conventional processes for copolymerization in organic media using free radical initiators can be used for preparation by solution copolymerization. Emulsion copolymerization can likewise be carried out by conventional methods, i.e. the conventional ionic and non-ionic emulsifiers can be used for emulsifying the monomers and stabilizing the latex. Examples of suitable anionic emulsifiers are: alkyl sulfates, alkylaryl sulfates, alkylarylsulfonates and alkali metal and/or ammonium salts of alkyl or alkylaryl polyglycol ethersulfates, and examples of suitable nonionic emulsifiers are: oxyethylated fatty alcohols and oxyethylated alkylphenols. The amount of emulsifier used is in general 0.3-5% by weight, based on the total weight of monomer.

In both cases the finished copolymer can, if appropriate, be converted into a water-soluble or colloidally water-dispersible copolymer salt by neutralization with bases, preferably with alkali metal, ammonium or amine bases.

The following factors, inter alia, should be considered when choosing the type and proportions of the comonomers (a) to (e). The use of the unsaturated carboxylic acids listed as component (a) contributes to ensuring easy dispersibility of the copolymers in aqueous dispersion. In the partially or completely neutralized form, component (a) also, inter alia, contributes decisively to achieving the water-solubility or colloidal water-dispersibility of the copolymer salts.

Component (b) is the constituent of the copolymers which probably most contributes to the development of the desired overall properties. Since the crotonic acid esters which are preferentially employed undergo self-polymerization only with difficulty or not at all, their use in copolymerization reactions cannot lead to segments of surface-active crotonic acid esters in the copolymer. The action of the resulting copolymer as a thickener and rheology-modifier can be influenced by varying the length of the ethylene oxide chain in the crotonic acid ester. Thus, for example, the viscosity-increasing action of the copolymer in aqueous systems increases as the ethylene oxide chain length increases.

The relative amounts of components (a) to (d) can vary within a relatively wide range. They can preferably be (a) 5–45% by weight, (b) 0.5–30% by weight, (c) 30–85% by weight and (d) 0–40% by weight; (a) 5–40% by weight, (b) 1–25% by weight, (c) 40–80% by weight and (d) 0–35% by weight are particularly preferred; (a) 8–40% by weight, (b) 3–20% by weight, (c) 50–75% by weight and (d) 0–30% by weight are very particularly preferred.

The conventional water-soluble initiators which start free radical chains are preferably used in amounts of 0.01–2% by weight, based on the total amount of monomer, to initiate the emulsion copolymerization. Examples of these initiators are, inter alia, alkali metal persulfates or ammonium persulfate. The polmerization temperature is adjusted in the conventional manner according to the half-lives of the initiators.

To increase the thickener capacity or for further influencing of the rheological properties of the dissolved copolymers in aqueous systems, it may in some cases be advantageous also to use a polyethylenically unsaturated compound as a comonomer. Comonomers of this type which can be used are crosslinking comonomers, such as, for example, diallyl phthalate, divinylbenzene, allyl methacrylate or ethylene glycol dimethacrylate. The amounts used can be varied within a range from 0 to 3% by weight, preferably 0 to 1% by weight, based on the total amount of monomer. During the polymerization, branches or networks develop which, after more or less complete neutralization of the copolymer, may lead to the formation of gel structures and hence to the development of specific rheological property profiles.

Finally, the use of molecular weight regulators during the copolymerization leads to relatively low molecular weights of the copolymers. The viscosity of the aqueous solutions of such copolymers thus falls, compared with the non-regulated products. The possibility of adjusting the required balance between the shear viscosity and the shear stability of the functional fluids prepared in a controlled manner for specific application systems can in this way be improved. All compounds which have the property of transferring free radicals can be used as the regulators. Preferred examples here are mercaptans (monofunctional and polyfunctional), such as, for example, n— and t-dodecylmercaptan, tetrakis-mercaptoacetyl-pentaerythritol and thioglycolic acid. However, other compounds can also be used as regulators, such as, for example, α-methylstyrene, toluene, trichlorobromomethane and carbon tetrachloride. The amount of regulator used can thereby be varied within a range of 0 to 5% by weight, based on the total amount of monomer.

The thickener capacity of copolymers can additionally be influenced by the (further) addition of ionic or non-ionic emulsifiers to the aqueous system, especially before, but also after, the free acid groups of the copolymer have been neutralized.

It has now been found, surprisingly, that the copolymers or copolymer salts or partial salts described have significantly higher thickener capacities in aqueous solution than comparable copolymers or salts thereof which have been prepared under identical conditions in the absence of corresponding unsaturated surface-active esters. It has been possible to observe the better thickener capacity of the copolymers both in the high-shear range (shear gradient $D=10,000s^{-1}$) and in the low-shear range ($D=0.1s^{-1}$). This has, inter alia, the advantage that smaller amounts of the thickener for the functional fluids according to the invention are required to impart certain rheological and physical chemical properties to aqueous systems.

The copolymers described are preferably used in their partly or completely base-neutralized water-soluble or colloidally water-dispersible form. Whilst the copolymers in their free acid form are preferably water-insoluble products, their salts with bases, in particular the alkali metal, ammonium or amine salts, are water-soluble, giving clear solutions, or water-dispersable in colloidal form.

The copolymers described not only have a thickening action, but also act as anti-corrosion agents, lubricants and anti-wear agents and cavitation inhibitors and, because of this broad action, are suitable for a large number of functional fluids. These functional fluids can be prepared either by diluting the copolymers, which are in the form of low-viscosity dispersions or solutions in a suitable solvent, directly with water, together with the addition of possible further substances, or by first preparing so-called preformulations, which contain the copolymer in a concentrated form and which can then be diluted further. The pH must be adjusted to a value of 5.5 to 10.5, in particular 7 to 9, by the addition of bases, in order to achieve the desired thickening action. Examples of bases which can be used for this purpose are ammonium, alkali metal and alkaline earth metal hydroxides and organic amines. Preferred amines are alkanolamines, such as triethanolamine, diethanolamine, monoethanolamine and triisopropylamine.

The nature and composition of the preformulation depends on the type of functional fluid which is to be prepared. The preformulation preferably contains in the form of an aqueous solution, a gel or a paste, all the additives which will also be required in the finished functional fluid, together with the copolymers described. These additives include, above all, conventional lubricant additives, anti-wear additives, further corrosion inhibitors and anti-foam agents. The preformulations can also contain, for example for working fluids free from mineral oils, solubilizers, such as glycols and polyalkylene oxide polymers as well as water-soluble polyhydroxy compounds, such as glycerol. Preformulations for the type of working fluid of low mineral oil content (micro emulsions) can additionally contain conventional mineral oil emulsifiers, a mineral oil and, where relevant, also synthetic mineral oil substitutes, such as ester oils or alkylbenzenes.

The copolymer-containing preformulations according to the invention form a clear or transparent solution in water. They are stirred into the required amount of water in order to prepare the aqueous working fluids. In all cases the final concentration of the copolymers described, in the ready-to-use functional fluids, is approx. 1 to 40, preferably 1 to 20, in particular 1 to 10% by weight for the case of hydraulic fluids, and, in the case of metal-working fluids the final concentration is 0.3 to 20, preferably 0.5 to 10% by weight.

EXAMPLE 1

Synthesis of the surface-active crotonic acid ester (b):

828 g of oxyethylated ($C_{16}$–$C_{18}$)-fatty alcohol (n=50) are dried azeotropically in 828 g of toluene. After about 1.5 hours, 55.8 g of crotonic anhydride are added. The solution is boiled under reflux for a further 2.5 hours. After cooling, the toluene is stripped off in vacuo. Yield: 883 g of a brownish-yellow, water-soluble product of waxy consistency. The conversion check was made by thin layer chromatography.

The corresponding crotonic acid esters (a) and (c) to (o), which are likewise surface-active, were prepared from the oxyethylated alcohol components listed below under (a) and (c) to (o) analogously to the above instructions for the surface-active crotonic acid ester (b).

| Alcohol component | Degree of oxyethylation (moles of ethylene oxide) |
|---|---|
| (a) oxyethylated ($C_{16}$–$C_{18}$)—fatty alcohol | 80 |
| (b) oxyethylated ($C_{16}$–$C_{18}$)—fatty alcohol | 50 |
| (c) oxyethylated ($C_{16}$–$C_{18}$)—fatty alcohol | 25 |
| (d) oxyethylated ($C_{16}$–$C_{18}$)—fatty alcohol | 15 |
| (e) oxyethylated ($C_{16}$–$C_{18}$)—fatty alcohol | 11 |
| (f) oxyethylated tributylphenol | 50 |
| (g) oxyethylated tributylphenol | 30 |
| (h) oxyethylated tributylphenol | 18 |
| (i) oxyethylated ($C_{12}$–$C_{16}$)—perfluoroalcohol | 8 |
| (j) oxyethylated ($C_{12}$–$C_{16}$)—perfluoroalcohol | 13 |
| (k) oxyethylated nonylphenol | 30 |
| (l) oxyethylated nonylphenol | 23 |
| (m) oxyethylated nonylphenol | 14 |
| (n) oxyethylated nonylphenol | 8 |
| (o) crotonate of a propylene oxide/ethylene oxide block copolymer | |

EXAMPLE 2

Synthesis of copolymers by emulsion polymerization. Preparation of sample 1:

28 g of the Na salt of an alkylaryl polyglycol ethersulfate (50% strength by weight) were dissolved in 738 go of demineralized water (=E-water) in a (2 liter) 3-necked flask with a stirrer, reflux condenser and internal thermometer, and the solution was warmed to 80° C., with stirring. 10 ml of an initiator solution consisting of 0.25 g of ammonium persulfate in 50 g of E-water, and 50 g of a monomer mixture consisting of 252 g of ethyl acrylate, 63 g of acrylic acid and 35 g of surface-active crotonic acid ester (b) from Example 1 were added. The remainder of the monomer mixture was then metered in, starting after half an hour and over a period of 2 hours, together with the remainder of the initiator solution. When metering in had ended, the mixture was after-heated for a further hour, stirring being continued, and the batch was then brought to room temperature. Solids content of the dispersion: 30.1% by weight. The percentage composition of the copolymer content of sample 1 is given in Table 1.

Samples 2 to 13, likewise in dispersion form, were prepared from the particular monomer constituents and amounts listed in Table 1 in the same way as sample 1, by analogous emulsion polymerization reactions. The regulators and crosslinking agents also used in some cases were in each case admixed to the monomer mixture in the amounts given, based on the total amount of monomer.

By neutralizing the dispersion with aqueous sodium hydroxide solution, diethanolamine, triethanolamine or aqueous ammonia, it was possible to convert the copolymer constituents of samples 1 to 13 into water-soluble products with the desired properties.

TABLE 1

Composition of the copolymer constituents of dispersions 1 to 13 in % by weight of monomer units, in each case based on the copolymer without the regulator and crosslinking agent contents.

TABLE 1

| Sample No. | Ethyl acrylate (% by weight) | Acrylic acid (% by weight) | Methacrylic acid (% by weight) | Surface-active crotonate from Example 1 (b) (% by weight) | Regulator: n-dodecylmercaptan (% by weight) | Cross-linking agent: divinyl-benzene (% by weight) |
|---|---|---|---|---|---|---|
| 1 | 72 | 18 | — | 10 | — | — |
| 2 | 72 | 18 | — | 10 | 0.2 | — |
| 3 | 72 | 18 | — | 10 | 0.5 | — |
| 4 | 72 | 18 | — | 10 | 1.0 | — |
| 5 | 80 | 20 | — | — | — | — |
| 6 | 80 | 20 | — | — | 0.2 | — |
| 7 | 55 | 20 | 5 | 20 | 0.2 | — |
| 8 | 50 | 20 | 10 | 20 | 0.2 | — |
| 9 | 40 | 20 | 20 | 20 | 0.2 | — |
| 10 | 72 | 18 | — | 10 | 0.2 | 0.25 |
| 11 | 72 | 18 | — | 10 | 0.2 | 0.5 |
| 12 | 72 | 18 | — | 10 | 0.2 | 1.0 |
| 13 | 50 | — | 40 | 10 | 0.3 | — |

EXAMPLE 3

Further copolymers (samples 14–35) were prepared by emulsion polymerization using the formulation indicated in Example 2.

ener, in order to prepare aqueous solutions containing 5 or 10% by weight of thickener, 4% by weight of triethanolamine (TEA) and 86 or 91% by weight of water. For a final mixture of 100 g, 4 g of TEA was dissolved in each case in the residual amount of water required for this purpose, and the particular emulsion polymer was added, with stirring. Liquids of high viscosity which are clear to slightly turbid in water are formed from these ingredients. The viscosity of these solutions is determined by means of a Contraves LS 30 low-shear viscometer, at a shear rate $D \leq 100$ $S^{-1}$. The results of the viscosity determination are indicated in Table 3 for $T=25°$ C. and $50°$ C., as a function of the concentration of thickener. The viscosity of a 4% strength by weight unthickened TEA/water solution and the viscosity of a 5, 10 or 20% strength by weight solution of polyglycol

TABLE 2

| Sample No. | ethyl acrylate (% by weight) | methacrylic acid (% by weight) | acrylic acid (% by weight) | styrene (% by weight) | surface-active crotonic ester (No.) | surface-active crotonic ester (% by weight) | regulator: n-dodecylmercaptan (% by weight) |
|---|---|---|---|---|---|---|---|
| 14 | 50 | 40 | — | — | 1a | 10 | 0.3 |
| 15 | 50 | 40 | — | — | 1f | 10 | 0.3 |
| 16 | 50 | 40 | — | — | 1g | 10 | 0.3 |
| 17 | 50 | 40 | — | — | 1h | 10 | 0.3 |
| 18 | 50 | 40 | — | — | 1h | 10 | 0.2 |
| 19 | 50 | 40 | — | — | 1h | 10 | 0.1 |
| 20 | 50 | 40 | — | — | 1g | 10 | 0.1 |
| 21 | 50 | 40 | — | — | 1g | 10 | 0.2 |
| 22 | 40 | 45 | — | — | 1g | 15 | — |
| 23 | 40 | 40 | — | — | 1i | 20 | 0.1 |
| 24 | 30 | 40 | — | — | 1c | 30 | 0.5 |
| 25 | 45 | 35 | — | — | 1h | 15 | 0.3 |
| 26 | 50 | 45 | — | — | 1f | 5 | 0.2 |
| 27 | 60 | 30 | — | — | 1e | 20 | — |
| 28 | 45 | 25 | — | — | 1j | 30 | 0.2 |
| 29 | — | — | 10 | 80 | 1f | 10 | 0.2 |
| 30 | — | — | 20 | 70 | 1f | 10 | 0.2 |
| 31 | — | 20 | 10 | 60 | 1f | 10 | 0.2 |
| 32 | — | 40 | — | 55 | 1h | 5 | 0.1 |
| 33 | — | 30 | — | 65 | 1h | 5 | 0.3 |
| 34 | — | 40 | — | 40 | 1m | 20 | 0.2 |
| 35 | — | 35 | — | 45 | 1g | 10 | — |

EXAMPLE 4

Samples 13, 14, 16 and 20 were selected from the emulsion polymers prepared according to Examples 2 and 3, each containing approx. 30% by weight of thick- (ethylene oxide/propylene oxide ratio 4:1, molecular weight 20,000) in water containing 4% by weight of TEA are indicated, for the corresponding temperatures, as comparison values. The pH of the solutions is also indicated in Table 3.

TABLE 3

| | The results of viscosity determinations on aqueous functional fluids | | | | | | | |
|---|---|---|---|---|---|---|---|---|
| | | | total water | | | | viscosity at $D \leq 100$ s$^{-1}$ | |
| thickener sample no. | concentration (% by weight) | TEA (% by weight) | (a) thickener dispersion | (b) residual water | temp. (°C.) | pH | (mPas) | $\eta 50°$ C./$\eta 25°$ C. |
| no thickener | — | 4 | — | 96 | 25 | 9.34 | 1.0 | 64.0% |

TABLE 3-continued

The results of viscosity determinations on aqueous functional fluids

| thickener sample no. | concentration (% by weight) | TEA (% by weight) | total water (a) thickener dispersion | total water (b) residual water | temp. (°C.) | pH | viscosity at $D \leq 100 \text{ s}^{-1}$ (mPas) | $\eta 50° \text{C.}/\eta 25° \text{C.}$ |
|---|---|---|---|---|---|---|---|---|
| 13 | 5 | 4 | 11.7 | 79.3 | 50 | — | 0.64 | |
|    |   |   |      |      | 25 | 7.53 | 114 | 40.4% |
| 13 | 10 | 4 | 23.3 | 62.7 | 50 | — | 46 | |
|    |    |   |      |      | 25 | 5.99 | 686 | 24.5% |
| 14 | 5 | 4 | 11.7 | 79.3 | 50 | — | 168 | |
|    |   |   |      |      | 25 | 7.45 | 132 | 40.2% |
| 14 | 10 | 4 | 23.3 | 62.7 | 50 | — | 53 | |
|    |    |   |      |      | 25 | 5.94 | 899 | 22.8% |
| 16 | 5 | 4 | 11.7 | 79.3 | 50 | — | 205 | |
|    |   |   |      |      | 25 | 7.58 | 98 | 51.0% |
| 16 | 10 | 4 | 23.3 | 62.7 | 50 | — | 50 | |
|    |    |   |      |      | 25 | 6.01 | 1,003 | 28.4% |
| 20 | 5 | 4 | 11.7 | 79.3 | 50 | — | 285 | |
|    |   |   |      |      | 25 | 7.58 | 180 | 50.0% |
| 20 | 10 | 4 | 23.3 | 62.7 | 50 | — | 90 | |
|    |    |   |      |      | 25 | 6.03 | 1,470 | 32.5% |
| EO/PO copolymer, CEO:PO = 4:1, | 5 | 4 | — | 91.0 | 50 | — | 477 | |
|    |    |   |      |      | 25 | 9.40 | 3.3 | 54.5% |
|    |    |   |      |      | 50 | — | 1.8 | |
|    |    |   |      |      | 25 | 9.50 | 8.4 | |
| MW approx. 20,000 | 10 | 4 | — | 86.0 | 50 | — | 4.3 | 51.2% |
|    | 20 | 4 | — | 76.0 | 25 | — | 33.6 | |
|    |    |   |      |      | 50 | 9.64 | 17.0 | 50.6% |

EXAMPLE 5

Aqueous fluids of the following composition are prepared using a number of the polymers described in Examples 2 and 3, each having a solids content of approx. 30% by weight:

1% by weight of ethylene oxide/propylene oxide block polymer, 2% by weight of triethanolamine, 0.8% by weight of diethanolamine, 1.6% by weight of carboxylic acid derivative, 4.5% by weight of thickener solids and 90.1% by weight of total water (10.1% of water from the dispersion and 80% of tap water, 20° of German hardness). Table 4 indicates the viscosities of the unthickened and thickened fluids, the viscosities being measured at T=25° C. and 50° C. using a KPG-Ubbelohde viscometer with a suspended ball level, DIN 51,562. The corresponding data for a commercially available product, ®Plurasafe P1200, BASF Wyandotte, are also indicated in Table 4, the stock concentrate of the latter being diluted so that approximately the same viscosity as in the other samples was obtained. This also applies to the concomitant use of this product in Examples 6, 7 and 9 below. The last column of Table 4 indicates the viscosity ratio $v50° \text{C.}/v25° \text{C.}$ of the individual fluids as a %. A high percentage is desirable, at high viscosities at the same time.

TABLE 4

Viscosities of aqueous functional fluids

| thickener sample No. | concentration (% by weight) | additives (% by weight) | total water, % by weight (a) water in dispersion | total water, % by weight (b) tap water | pH | temp. (°C.) | viscosity $\frac{(mm^2)}{s}$ | $v_{50°} \text{C.}/v_{25°} \text{C.}$ (%) |
|---|---|---|---|---|---|---|---|---|
| no thickener | — | 5.4 | — | 94.6 | 9.18 | 25 | 1.11 | 64.0 |
|  |  |  |  |  | — | 50 | 0.71 |  |
| 15 | 4.5 | 5.4 | 10.1 | 80.0 | 6.87 | 25 | 101.2 | 22.6 |
|  |  |  |  |  | — | 50 | 22.8 |  |
| 16 | 4.5 | 5.4 | 10.1 | 80.0 | 6.92 | 25 | 68.4 | 31.4 |
|  |  |  |  |  | — | 50 | 21.5 |  |
| 17 | 4.5 | 5.4 | 10.1 | 80.0 | 6.85 | 25 | 61.2 | 34.6 |
|  |  |  |  |  | — | 50 | 21.2 |  |
| 18 | 4.5 | 5.4 | 10.1 | 80.0 | 6.76 | 25 | 48.2 | 37.1 |
|  |  |  |  |  | — | 50 | 17.9 |  |
| 21 | 4.5 | 5.4 | 10.1 | 80.0 | 6.95 | 25 | 43.3 | 39.5 |
|  |  |  |  |  | — | 50 | 17.1 |  |
| Plurasafe ® P 1200 | 8 | — | — | 92.0 | 9.90 | 25 | 43.2 | 12.5 |
|  |  |  |  |  | — | 50 | 5.4 |  |

EXAMPLE 6

The test instrument described in DIN 51,382 is used in order to test the shear stability of the working fluids described in Example 5, containing polymers Nos. 15, 16 and 17. A liquid volume of approx. 170 cm³ of the individual samples is subjected to a shear stress in a specific number of cycles in the test instrument, the essential elements of which are a two-cylinder pump and an injection nozzle which has been adjusted to an ejection pressure of 40 bar. The kinematic viscosity of the individual samples is measured as specified in DIN 51,562, part 1, at a specific temperature, before and after the shear stress. The shear stability measurements of the working fluids investigated are indicated in Table 5 as the % relative decrease in viscosity $(v_o - v_1)/v_o$, where $v_o$ represents the kinematic viscosity of the unsheared samples and $v_1$ represents the kinematic viscosity of each of the samples sheared by 40 shear passage cycles. Positive values of the relative decrease in viscosity denote here a decrease in viscosity. Shear tests with the commercially available product Plurasafe P1200, BASF Wyandotte, are indicated for comparison.

EXAMPLE 7

The non-Newtonian viscosity of the functional fluids prepared in Example 5 is tested by investigating the fluid prepared with sample No. 17 in a high-shear viscometer (rotational viscometer, made by Haake). The viscosity of this functional fluid is determined as a function of the shear rate D at T=25° C. At $D=1s^{-1}$, $\eta_1=60$ mPas, while at $D=10,000s^{-1}$ the viscosity figure $\eta 10,000=52$ mPas, or $\eta 10,000/\eta_1=86.7\%$. A commercially available product (Plurasafe P1200, BASF Wyandotte) having a comparable thickening action gives the following data: $\eta_1=43.2$ m Pas, $\eta 10,000=27$ mPas and $\eta 10,000/\eta_1=62.5\%$.

| Working fluid according to Example 4; sample No.: | Temp. (°C.) | Relative change in viscosity as % of initial viscosity 0 |
|---|---|---|
| 15 | 50 | +1 |
| 16 | 50 | ±0 |
| 17 | 50 | ±0 |
| ® Plurasafe P1200 | 50 | +8 |

TABLE 5

Determination of the shear stability of aqueous functional fluids after 40 shear passage cycles.

EXAMPLE 8

The anti-corrosion action of the polymers described in Example 3 was investigated and assessed on a comparative basis in the examples set out below, using the method of DIN 51,360, sheet 2.

| concentrate without active substance | 11.0% by weight of diethanolamine<br>11.0% by weight of triethanolamine<br>78.0% by weight of water, 20° of German hardness |
|---|---|
| concentrate I | 2.7% by weight of active substance, sample No. 15<br>11.0% by weight of diethanolamine<br>11.0% by weight of triethanolamine<br>75.3% by weight of water, 20° of German hardness |
| concentrate II | 2.7% by weight of active substance, sample No. 16<br>11.0% by weight of diethanolamine<br>11.0% by weight of triethanolamine<br>75.3% by weight of water, 20° of German hardness |
| concentrate III | 2.7% by weight of active substance, sample No. 17<br>11.0% by weight of diethanolamine<br>11.0% by weight of triethanolamine<br>75.3% by weight of water, 20° of German hardness |

Aqueous preparations containing 3, 5, 8 and 10% by weight of concentrate were used for the tests. i-Nonanoyl-ε-aminocaproic acid was used as the comparison, as a typical carboxylic acid frequently used as a corrosion inhibitor in machining auxiliaries.

| Comparison concentrate |
|---|
| 2.7% by weight of i-nonanoyl-ε-aminocaproic acid<br>11.0% by weight of diethanolamine<br>11.0% by weight of triethanolamine<br>75.3% by weight of water, 20° of German hardness |

The results of the investigations are summarized in Table 6. The results show that the functional fluids according to the invention exhibit inhibiting properties like special corrosion inhibitors when used in comparable use concentrations.

| concentrate (% by weight) | 3 | 5 | 8 | 10 |
|---|---|---|---|---|
| Degree of corrosion as specified in DIN 51,360, sheet 2 | | | | |
| Concentrate without active substance | 4 | 3-4 | 3 | 3 |
| Concentrate I | 4 | 3 | 2 | 0 |
| Concentrate II | 4 | 2 | 2 | 0 |
| Concentrate III | 4 | 3 | 1-2 | 0 |
| Comparison concentrate | 4 | 3 | 0 | 0 |

TABLE 6

The anti-corrosion action of the polymers described in Example 3, in aqueous solution.

EXAMPLE 9

The lubricating quality of the functional fluids according to the invention was investigated by using the so-called 4-ball apparatus. The principle of the method is described in "Fünfter Bericht über Anforderungen und Prüfungen schwer entflammbarer Flüssigkeiten zur hydraulischen Kraftübertragung und Steuerung" ["Fifth report on requirements for, and tests of, fluids of low flammability for hydraulic transmission of power and control"], published by the Commission of The European Communities, Luxembourg 1974.

The tests were carried out with an increasing load, the test period suggested in Part III—3.12.6, page 82, being increased from 10 seconds to 1 minute.

The results are shown in Table 7. They illustrate the effectiveness of the functional fluids according to the invention. Maximum load is to be understood here as meaning the final load before reaching the fusing load. In addition to a commercially available HFC hydraulic fluid based on ethylene oxide/propylene oxide copolymers, an 8% strength by weight solution of the commercial product Plurasafe P1200 of BASF Wyandotte and an HFC hydraulic fluid prepared on the basis of an ethylene oxide/propylene oxide copolymer of molecular weight 20,000 and having an ethylene oxide propylene oxide ratio of 4:1 were used as a comparison.

The superior lubricating quality of the functional fluids according to the invention is substantiated by the generally higher values of fusing loads.

TABLE 7

The lubricating quality of the polymers described in Example 3 in aqueous functional fluids

| sample No. from Example 2 + 3 | formulation tested | maximum load (kp) | cross-section of ball impression (mm) | fusing load (kp) |
|---|---|---|---|---|
| 13 | 4.5% by weight of active substance<br>4.0% by weight of TEA<br>91.5% by weight of H₂O, 20° German hardness | 210 | 1.02 | 220 |

TABLE 7-continued

The lubricating quality of the polymers described in Example 3 in aqueous functional fluids

| sample No. from Example 2 + 3 | formulation tested | maximum load (kp) | cross-section of ball impression (mm) | fusing load (kp) |
|---|---|---|---|---|
| 16 | 4.5% by weight of active substance 4.0% by weight of TEA 91.5% by weight of H$_2$O, 20° German hardness | 240 | 1.06 | 260 |
| 20 | 4.5% by weight of active substance 4.0% by weight of TEA 91.5% by weight of H$_2$O, 20° German hardness | 230 | 1.03 | 220 |
| 16 | 13.5% by weight of active substance 5.5% by weight of DEA 15.0% by weight of EG 66.0% by weight of H$_2$O, 20° German hardness | 210 | 1.10 | 220 |
| comparison commercially available HFC fluid Plurasafe ® P 1200 | 8% by weight of Plurasafe 92% by weight of H$_2$O, 20° German hardness | 160 160 | 0.97 0.82 | 180 180 |
| EO/PO copolymer (EO:PO = 4:1) MW approx. 20,000 | 25% by weight of copolymer 25% by weight of ethylene glycol 50% by weight of H$_2$O, 20° German hardness | 160 | 1.22 | 180 |

We claim:

1. An aqueous functional fluid which contains a copolymer prepared by emulsion or solution copolymerization, initiated by free radicals, of unsaturated, copolymerizable monomers, the copolymer being built up from the components comprising:
   (a) 1–60% by weight of ethylenically unsaturated (C$_3$–C$_5$)-monocarboxylic acids, ethylenically unsaturated (C$_4$–C$_6$)-dicarboxylic acids or monoesters thereof with aliphatic (C$_1$–C$_8$)-alcohols, or mixtures of these monomers;
   (b) 0.5 to 30% by weight of a surface-active, unsaturated ester of the general formula I

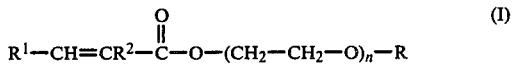

in which n denotes a number from 2 to 100, R$^1$ and R$^2$ denote hydrogen or methyl, and R denotes a di- or tri-alkylphenyl radical with alkyl groups of in each case 4 to 12 carbon atoms or a block-copolymeric radical of the formulae IIa or IIb

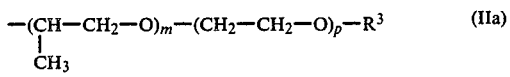

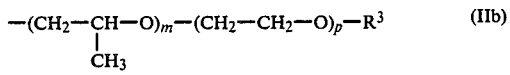

in which m represents a number from 10 to 100, p represents a number from 0 to 100 and R$^3$ represents H, crotyl, (C$_1$–C$_{20}$)-alkyl, phenyl or alkylphenyl with (C$_1$–C$_{20}$)-alkyl groups,
   (c) 30–85% by weight of methacrylic acid esters or acrylic acid esters of aliphatic (C$_1$–C$_{18}$)-alcohols or a mixture of these esters,
   (d) 0–40% by weight of other ethylenically unsaturated comonomers,
   (e) 0–3% by weight of polyethylenically unsaturated compounds, and
   (f) 0–5% by weight of molecular weight regulators.

2. An aqueous functional fluid as claimed in claim 1 which contains a copolymer prepared by said emulsion or solution copolymerization, followed by partial or complete neutralization of the free acid groups of the copolymer by addition of a base, said copolymer comprising:
   (a) 5–45% by weight of methacrylic acid, acrylic acid, crotonic acid, maleic acid, monoalkyl maleates or mixtures thereof,
   (b) 0.5 to 30% by weight of a surface-active, unsaturated ester of said general formula I in which R$^1$ denotes methyl and R$^2$ denotes hydrogen;
   (c) 30–85% by weight of a said methacrylic acid ester or acrylic acid ester or a mixture of these esters,
   (d) 0–40% by weight of vinyl esters, vinyl-aromatics, ethylenically unsaturated nitriles, esters of ethylenically unsaturated monocarboxylic and dicarboxylic acids, where these have not already been listed above under said component (c), ethylenically unsaturated sulfonic acid derivatives, or mixtures thereof,
   (e) 0–3% by weight of divinylbenzene, diallyl phthalate and butanedioldiacrylate or dimethacrylate or mixtures thereof,
   (f) 0–5% by weight of dodecylmercaptan, tetrakismercaptoacetylpentaerythritol, carbon tetrachloride or bromotrichloromethane, or mixtures thereof.

3. An aqueous functional fluid as claimed in claim 1, which contains a copolymer containing 0.5 to 30% by weight of a crotonic acid ester of the formula

4. An aqueous functional fluid as claimed in claim 1, which is a hydraulic fluid and contains 1 to 40% by weight of the copolymers.

5. An aqueous functional fluid as claimed in claim 1, which is a metal-working fluid and contains 0.3 to 20% by weight of the copolymers.

6. An aqueous functional fluid as claimed in claim 1, wherein R denotes a tri-alkylphenyl radical with alkyl groups of in each case 4 to 12 carbon atoms.

* * * * *